United States Patent

Jeremiasson et al.

[11] Patent Number: 6,158,273
[45] Date of Patent: Dec. 12, 2000

[54] METHOD AND DEVICE FOR DETECTING MISFIRING OF INTERNAL COMBUSTION ENGINES

[75] Inventors: Jan Jeremiasson; Jarl Sobel; Christer Wallin, all of Västerås, Sweden

[73] Assignee: Asea Brown Boveri AB, Vasteras, Sweden

[21] Appl. No.: 09/202,451

[22] PCT Filed: Jun. 19, 1997

[86] PCT No.: PCT/SE97/01120

§ 371 Date: Feb. 8, 1999

§ 102(e) Date: Feb. 8, 1999

[87] PCT Pub. No.: WO97/48894

PCT Pub. Date: Dec. 24, 1997

[30] Foreign Application Priority Data

Jun. 20, 1996 [SE] Sweden .................................. 9602437

[51] Int. Cl.[7] .............................................. G01M 15/00
[52] U.S. Cl. ................................................... 73/117.3
[58] Field of Search ................................. 73/116, 117.2, 73/117.3, 118.1

[56] References Cited

U.S. PATENT DOCUMENTS

| | | | |
|---|---|---|---|
| 5,207,200 | 5/1993 | Iwata | 123/425 |
| 5,216,915 | 6/1993 | Sakamoto | 73/117.3 |
| 5,269,178 | 12/1993 | Vigmostad et al. | 73/116 |
| 5,278,760 | 1/1994 | Ribbens et al. | 364/424.1 |
| 5,313,826 | 5/1994 | Klauber et al. | 73/118.1 |
| 5,353,636 | 10/1994 | Sakurai et al. | 73/117.3 |
| 5,495,774 | 3/1996 | Klauber et al. | 73/118.1 |
| 5,675,094 | 10/1997 | Klauber et al. | 73/862.191 |
| 5,856,922 | 1/1999 | Jehanno | 73/116 |
| 5,869,752 | 2/1999 | Klauber et al. | 73/116 |
| 5,902,934 | 5/1999 | Sprague et al. | 73/116 |

FOREIGN PATENT DOCUMENTS 0 637 738 A1  8/1995  European Pat. Off. .

OTHER PUBLICATIONS

Vaidyanathan, Design and Implementation of Digital FIR Filters, Chapter 2, 12/ Handbook of Digital Signal Processing, pp. 55–67, Academic Press, Inc. 1987.

*Primary Examiner*—Eric S. McCall
*Attorney, Agent, or Firm*—Pollock, Vande Sande & Amernick

[57] ABSTRACT

A method for detection of misfiring of an internal combustion engine, wherein the torque of the internal combustion engine is measured with the aid of a torque sensor mounted on the crankshaft of the internal combustion engine and wherein a torque signal is sampled speed-synchronously with the aid of a sensor. A digital filtering of the torque signal is carried out with a digital filter with a finite impulse response which blocks or damps a selection of integer or half-integer multiples of the speed of the internal combustion engine. The selection of speed multiples is substantially dependent on the number of cylinders of the internal combustion engine.

31 Claims, 5 Drawing Sheets

METHOD AND DEVICE FOR DETECTING MISFIRING OF INTERNAL COMBUSTION ENGINES

TECHNICAL FIELD

The present invention relates to a method and to a device for detection of misfiring of an internal combustion engine, in which the torque of the internal combustion engine is measured by means of a torque sensor arranged on the crankshaft of the internal combustion engine and where a torque signal is sampled speed-synchronously.

BACKGROUND OF THE INVENTION

Misfiring of internal combustion engines is an operational disturbance which implies that the fuel/air mixture compressed in the cylinder is not completely burnt, or not burnt at all, for example because of a failing ignition spark (Otto engine) or disturbances during injection (Diesel engine). It therefore results in reduced power of the internal combustion engine, increased wear on components included and, in addition, entails increased emission of environmentally harmful substances as, for example, unburnt hydrocarbon compounds. Misfiring also contributes to reduction of the service life of the exhaust gas catalytic converter of the internal combustion engine. Detecting and indicating misfiring is, therefore, of great importance for an increased service life of internal combustion engines. Detection also permits a possibility of reducing the environmental influence and of complying in a better way with the increasingly stricter demands made by the legislation on emission of various pollutants from internal combustion engines.

One way of defining misfiring is based on the work which is carried out in each cylinder during a work cycle, which, in the case of a conventional four-stroke Otto engine or diesel engine, consists of two crankshaft turns (720°). If the work for a cylinder is insignificant in relation to the amount of fuel present in the cylinder, it can be said that, by definition, misfiring has taken place. As a measure of this work, a so-called indicated mean effective pressure (IMEP) is often used, which is obtained by dividing the measured work by the piston displacement of the cylinder.

Misfiring can be detected in a plurality of different ways.

A direct measurement of the cylinder pressure in each individual cylinder may, of course, be used for detecting misfiring. Because of the severe environment in which the necessary pressure sensors are to operate, the method is costly and has substantially been used only in very large internal combustion engines. Since the method is based on a comparison of the output signals from several different sensors, varying aging between the sensors may lead to problems with the reliability of the method after a long time. In addition, it is necessary to have access to the crank angle for each cylinder with great accuracy in order for the calculation of the work carried out to become reliable.

Another method for detecting misfiring comprises measuring the electrical conductivity of the gas present in the cylinders of the internal combustion engine. This measurement may be performed by using the spark plug of the respective cylinder as measuring electrode. Such a method is described, for example, in U.S. Pat. No. 5,207,200. During a misfire, the gas in the cylinder becomes colder than after a successful ignition, and the gas therefore has a lower conductivity during a misfire. An advantage of this method is that an electrical quantity may be measured directly without needing access to a separate sensor. However, the method places special demands on the design of the ignition system of the internal combustion engine. As an example, it may be mentioned that special spark plugs are required as well as a separate ignition coil for each cylinder. Problems may arise due to varying aging of the spark plugs and the reliability during no-load operation, acceleration and braking is not good. This, method makes demands for a very high calculation capacity. Additional methods for detecting misfiring are based on measurement of the engine speed, see, for example, U.S. Pat. No. 5,216,915 and U.S. Pat. No. 5,278,760. To equalize the power of the normal torque fluctuations of the internal combustion engine, the internal combustion engine is normally provided with a flywheel which equalizes the speed fluctuations. This implies that the variations which arise in the speed of the internal combustion engine because of misfiring will also decrease. A signal which may be obtained in different ways, and corresponding to these speed variations, will therefore have a low signal level. To this is to be added the fact that the signal is influenced by disturbances from irregularities in the base and a flywheel which is not perfectly balanced. Disturbances may furthermore arise in different operating situations such as during acceleration, changing, disengagement of the clutch etc. The combination of a high speed and a low load is an operational situation which involves problems difficult to handle because periodic inertial forces, generated primarily by the movements of the connecting rods and the pistons, dominate in relation to the force which is developed in and influences the pistons of the cylinders during faultless firing. In summary, the low signal level and the large number of disturbance sources imply that methods based on measurement of the engine speed require calculation-intense methods of evaluation and have a limited reliability.

SUMMARY OF THE INVENTION

The invention relates to a method and a device for detecting misfiring of an internal combustion engine wherein the torque of the internal combustion engine is measured with the aid of a torque sensor arranged on the crankshaft of the internal combustion engine and wherein a torque signal is sampled in a speed-synchronous manner.

The torque signal is filtered with a digital filter with a finite impulse response which greatly blocks or damps a selection of integer or half-integer multiples of the speed of the internal combustion engine, where the selection of speed multiples depends, among other things, on the number of cylinders of the internal combustion engine.

By measuring the torque on the crankshaft with a torque sensor, it is, in principle, possible to see the effect of each individual firing and to detect variations between the cylinders and subsequent firings in the same cylinder. When the firing in a cylinder completely fails, no net work is generated by that cylinder during its compression and expansion phase, which must also in some way manifest itself in the measured torque.

To measure the torque generated by the engine as accurately as possible, it is suitable to measure this torque as close to the crankshaft as possible, preferably between the crankshaft and the flywheel. In this way, the effect of torsional oscillations on the driving rope and vibrations when the car is driving on an uneven road surface are reduced.

The difficulty is to extract from the torque signal a measure per cylinder and work cycle which correlates well with the work carried out by the respective cylinder during the cycle mentioned, and hence makes possible detection according to the definition of misfiring. In addition, the method should preferably be inexpensive to implement.

However, the instantaneous value of the output signal of the torque sensor is not, by itself, a good instrument for detecting misfires, except possibly at very low speeds, when the influence of resonant oscillations is small. During resonance, the amplitude of the resonant oscillations may exceed the change of the torque on account of failing firing by a factor of ten.

The method according to the invention for obtaining a measure of misfiring comprises forming a weighted mean of the torque signal within an interval around the firing time for each cylinder. With a suitably chosen weighting function, an indicated mean effective torque (IMET) may thus be formed, which correlates well with the work carried out by the cylinder, independently of resonant oscillations. This is achieved by determining the weighting function in a way which makes the weighted mean independent of cyclic variations with definite periodicities of the signal.

A more detailed explanation of how the above-mentioned weighting function is to be formed, and how the method functions, is based on the properties of digital filters with a finite impulse response filter, or FIR filter. These are described more closely in a number of books on the subject, among other things in Handbook of Digital Signal Processing, Ed. by Douglas F. Elliot, Academic Press 1987, Chapter 2, page 55 et seq.

When filtering with a digital FIR filter, the input signal is sampled at discrete points of time. The output signal from the filter then consists of a weighted mean of a number of samples from the input signal to the filter. The weighting function constitutes the so-called impulse response of the filter. For each new sample point in the output signal, the mean value formation of the input signal is carried out displaced by one sample point. In this way, new values from the input signal will constantly give rise to the output signal. Mathematically, this method implies that the input signal is convoluted with the impulse response of the FIR filter. The impulse response completely determines the properties of the filter.

A filter with a rectangular impulse response, a so-called comb filter, has, for example, the property that all the frequencies which are multiples of the inverse of the duration of the impulse response are completely eliminated, and adjacent frequencies are damped in a characteristic way. Filtering with such a filter means that the running mean value of the input signal during a certain period of time, or of a certain number of samples corresponding to the duration of the impulse response, is continuously formed during a certain time.

For the use during misfiring detection, it is sufficient to carry out the FIR filtering at only one definite crankshaft angle in relation to the upper dead center of the respective cylinder at the beginning of the power stroke, where a suitable crankshaft angle is chosen according to experience to obtain the clearest reading. This means that the actual calculation only needs to be carried out N times per two turns of the crankshaft, where N is the number of cylinders of the engine.

The dynamic behavior of the crankshaft in an internal combustion engine is very complex and may be regarded as a number of different part-processes which, taken together, give rise to a characteristic oscillation behavior superimposed on the speed of the output shaft. One way of describing this oscillation behavior for different loads and speeds is to use so-called tracking curves, which show the oscillation amplitude divided into its different harmonic components as a function of the speed.

Depending on the number and location of the cylinders in the engine block, characteristic oscillation behaviors arise for each internal combustion engine.

The torsional oscillation behavior of a five-cylinder in-line engine primarily comprises the combustions exciting oscillations constituting the $2.5^{th}$ tone to the speed and its harmonics. This is due to the fact that the internal combustion engine ignites five times per two turns. This excitation results in resonant oscillations where the different harmonics arrive to different degrees at different speeds with their maximum at the frequency where the frequency of the harmonic corresponds to the resonant oscillation of the internal combustion engine. At certain speeds, oscillations with frequencies equal to two and three times the speed are also of importance and give rise to different effects.

In a four-cylinder in-line engine, for example, the second tone to the speed and its harmonics are completely predominant.

In the same way, the torsional oscillation behavior for engines with other numbers of cylinders and other cylinder devices may be derived theoretically or be measured experimentally. The theoretical derivation is most suited for in-line engines with equidistant ignitions, the experimental measurement for engines with a more complicated structure, for example V-engines.

To obtain the indicated mean effective torque independently of its torsional oscillations, according to the invention a weighting function (impulse response) is chosen which filters away oscillations at these frequencies.

The most common form of digital filtering involves sampling the signal to be filtered at definite times separated by a constant time interval, the so-called sample period. This method is suitable if it is desired to filter signals with a definite frequency content.

To make possible the use of the same filter function for detecting misfiring independently of the speed of the engine, according to the invention, use is made of the fact that disturbing torsional oscillations due to resonance only occur for such frequencies where the resonant frequency corresponds to a frequency which is excited by the engine. As described above, these excited frequencies are coupled to the speed of the engine.

By sampling instead the torque signal at times separated by an interval based on a certain rotation of the crankshaft, so-called speed-synchronous sampling, properties of the transfer function of a subsequent digital filter are obtained where the properties are coupled directly to the speed of the engine instead of to an absolute frequency. Such a method is therefore suitable for detecting misfiring.

For a four-cylinder engine, oscillations are excited with a frequency equal to multiples of twice the speed to the engine. A filter with a rectangular impulse response with a duration corresponding to half a revolution, which operates on a speed-synchronously sampled signal, eliminates these very frequencies independently of the speed of the engine. In addition, it is very simple and computationally effective to implement.

For a five-cylinder engine, a filter which eliminates frequencies equal to 2, 2.5 and 3 times the speed of the engine is required.

To reduce the crosstalk between the cylinders, and accuracy problems associated therewith, it is important that the filter used has an impulse response with as short an extent as possible. In addition, a short impulse response reduces the required number of multiplications and additions during the filtering.

Figure 2:
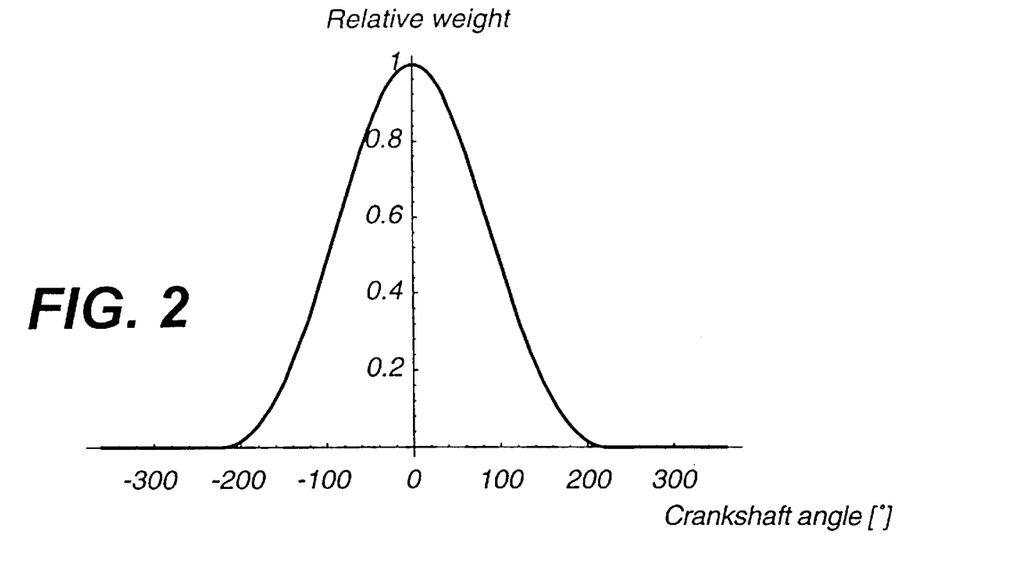
FIG. 2 shows an impulse response, obtained by convolution, for an FIR filter for the second, $2.5^{th}$ and third tones, suitable as weighting function for five-cylinder engines.
Figure 3:
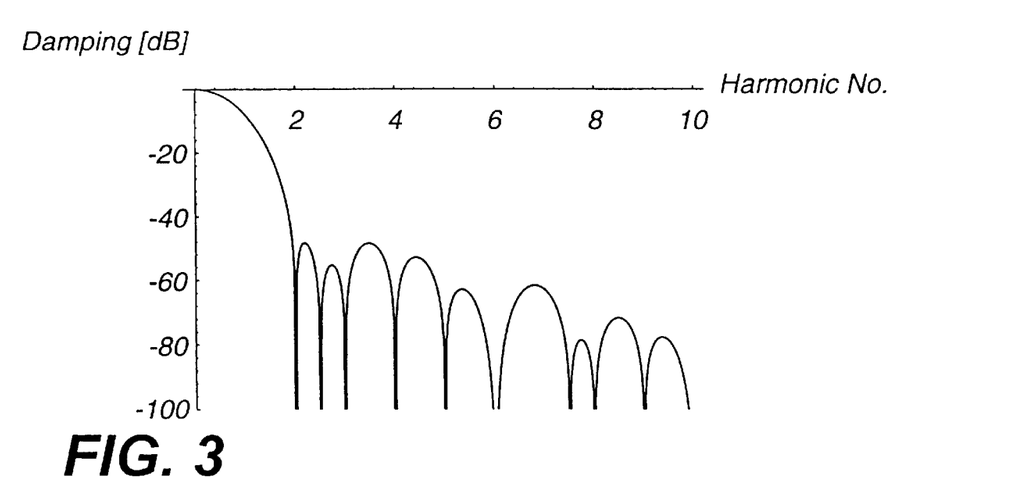
FIG. 3 shows the transfer function for an FIR filter according to FIG. 2.

A filter with a minimum length suitable for detecting misfiring in five-cylinder four-stroke engines is obtained according to the invention by combining filters with rectangular impulse responses, comb filters, corresponding to a 180°, 144° and 120° rotation of the crankshaft. During continuous filtering for each sample point, the most computationally effective way is to apply these three rectangular filters one after the other on the signal. For filtering at few selected sample points per revolution only, the filtering is instead performed by forming a combined impulse response for these filters where the impulse responses for each comb filter according to known technique are convoluted with one another. The impulse response thus obtained is shown in FIG. 2. The spectrum for the transfer function for such a filter is shown in FIG. 3.

In a corresponding way, a suitable filter for six-cylinder four-stroke engines is obtained by combining comb filters corresponding to 120° and 80°, respectively. This eliminates frequencies equal to 3 and 4.5 times the speed of the engine. For eight-cylinder four-stroke engines, a suitable filter is obtained by combining comb filters corresponding to 90°, 72° and 60°. This eliminates frequencies equal to 4, 5 and 6 times the speed of the engine.

The disadvantage of mean-value formation according to the above-mentioned technique is the relatively extensive calculation capacity which, despite the small number of filterings per two crankshaft turns, is required to carry out the number of multiplications and additions which is necessary. The number of required multiplications may, however, be eliminated completely and the number of additions be greatly reduced if, instead of forming a weighted mean according to conventional filter technique, an alternative method according to the invention is used.

According to this method, certain of the collected values are selected according to a definite pattern, for example 16 or 32 values, placed within an angular interval, which are then summed. The distribution of these samples within the angular interval determines the transfer function of the filter. Generally, a filter with zeros is obtained for a large number of frequencies in the transfer function, as well as a moderate damping at high frequencies. The moderate damping for high frequencies implies that the filter permits rapid changes of the output signal, which is desirable when detecting misfiring. The zeros imply that the filter completely eliminates the variation of the input signal at these frequencies, but allows signals with other frequencies to pass. By choosing the selection of sample points such that the zeros lie at the frequencies which are to be suppressed, that is, the frequencies which are excited by the engine type in question, the desired transfer function is obtained.

The calculation of the indicated mean effective torque may thus, according to the invention, be carried out in several different ways for different types of engines. It would also be possible to use different methods for the same engine, depending on the speed of the engine.

The indicated mean effective torque functions very well as a quantity for detecting occasional misfirings. For the most difficult operating case for detection of misfiring, which is low load at high speed, the difference in the indicated mean effective torque during normal operation and in case of misfiring is up to six times greater than the general noise level.

How misfiring is detected based on the indicated mean effective torque is to a certain extent a pure matter of definition, which must be determined in each individual case depending on the purpose of the misfiring detection.

This is especially apparent when it comes to misfiring detection during no-load operation and low speeds, when an internal combustion engine of course exhibits very great variations in work carried out per cylinder and likewise in the indicated mean effective pressure.

Misfiring may occur both as intermittent and continuous misfiring. The determination of how great a deviation from the normal indicated mean effective pressure that is to be allowed in these cases, without being classified as misfiring, must in certain cases be made on the basis of the requirements of law, or depending on the specifications of the engine manufacturer when dimensioning the components included in the engine.

The method according to the invention, which is used for detecting occasional misfirings, comprises comparing the indicated mean effective torque for a cylinder with a weighted mean of the indicated mean effective torque of adjacent firings. If the deviation is sufficiently great, that firing is considered a misfiring.

A variant of the above method is included as part of the invention. According to this variant, the standard deviation of previous firings is continuously formed and the threshold value is expressed in a number of standard deviations. The difference is then a measure of the extent to which the torque signal must deviate from a background noise which is present in the torque signal in this very operating case.

Within the scope of the invention, however, with the aid of mean-value formation of the indicated mean effective torque over a suitable number of cycles, a possibility of detecting very small differences in the indicated mean effective torque per cylinder may be obtained. Tests have shown that a sufficient difference for being able to detect continuous misfiring is obtained by mean-value formation over four cycles. This method is especially suitable for detecting unbalance between cylinders during normal operation. In this way it is possible to compensate for this unbalance, for example by individual control of the quantity of fuel injected into the cylinders.

BRIEF DESCRIPTION OF THE DRAWINGS

FIG. 9 shows the equidistant 16 sample points for a simplified FIR filter for four-cylinder engines and.

DETAILED DESCRIPTION OF THE PREFERRED EMBODIMENTS

Figure 1:
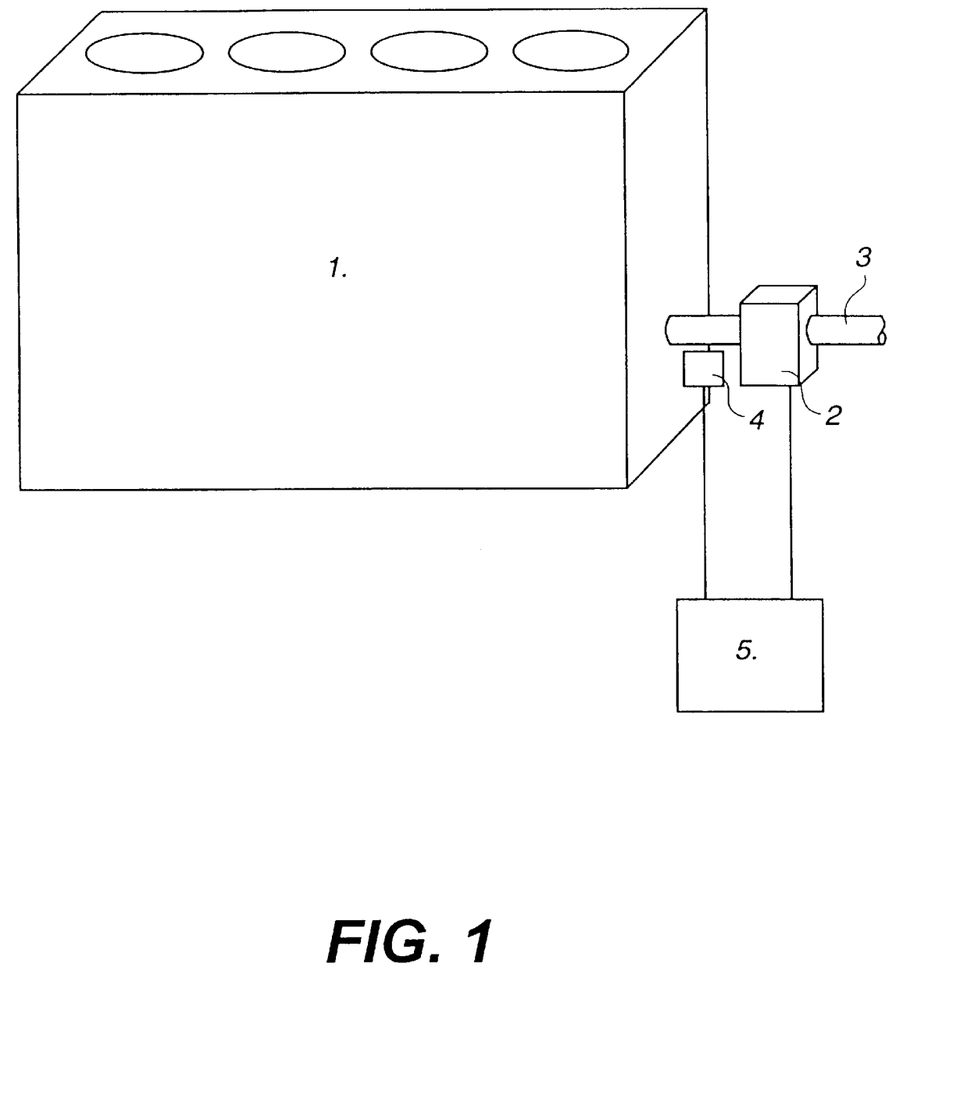
FIG. 1 shows an explanatory sketch of a device according to the invention for detecting misfiring of an internal combustion engine.

FIG. 1 shows an explanatory sketch of a device for carrying out a method according to the invention for detecting misfiring of an internal combustion engine 1. The torque of the internal combustion engine is measured by means of a torque sensor 2 mounted on the crankshaft 3 of the internal combustion engine, and a torque signal is sampled speed-synchronously with the aid of a sensor 4. The filtering of the torque signal is carried out with a digital filter 5 with a finite impulse response which blocks or damps a selection of integer or half-integer multiples of the speed of the internal combustion engine, where the selection of speed multiples is substantially determined by the number of cylinders of the internal combustion engine.

To obtain the highest possible accuracy in the indicated mean effective torque, the torque sensor is placed between the crankshaft and the flywheel.

If the calculation capacity does not constitute any limitation, the FIR filtering may be carried out in conventional manner. The torque signal is sampled speed-synchronously in an angular interval around each firing pulse and the mean value thereof is formed using a weighting function which for a five-cylinder engine corresponds to the impulse response of a filter for the second, $2.5^{th}$ and third tones and their harmonics. Such a filter function is obtained by convoluting a second, $2.5^{th}$ and third tone filter with one another. The convolution integral is approximated by steps corresponding to the sampling step and requires as many multiplications and additions as the number of samples which corresponds to the length of the impulse response.

The second-tone filter is rectangular with the value 1 for an interval of 180° and the value 0 for the remaining part of a work cycle (two turns, 720°). In a corresponding way, a 144° interval with the value 1 corresponds to the filter of the $2.5^{th}$ tone, a 120° interval with the value 1 the third-tone filter, etc. The phase position, that is, the centering of these intervals around an angle measured from the upper dead center at the beginning of the power stroke, may be chosen for optimization of the result.

For a five-cylinder engine, the weighting function of the filter is shown, which has been achieved with the already-described convoluting operation with the second, $2.5^{th}$ and third tones in FIG. 2, where the weighting function is shown in arbitrary units as a function of the angle relative to the upper dead center at the beginning of the power stroke. FIG. 3 shows the transfer function, that is, the damping in decibels as a function of the frequency in speed units, for this filter.

The filter becomes especially simple for a four-cylinder in-line engine since it only comprises the mean value of the torque signal during a suitably centered 180° interval for each cylinder.

An FIR filter with a result equal to that with the conventional method, but with a greatly reduced need of calculation capacity, may be advantageously obtained by selecting only certain of the sampled values, for example 16 or 32 values, placed within an angular interval, which are then summed. The distribution of these samples determines the frequency properties of the filter, as previously shown.

Figure 4:
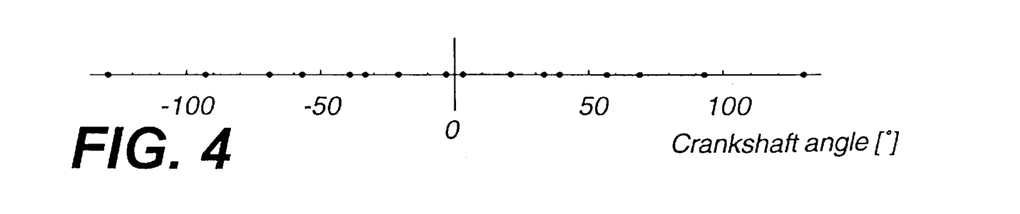
FIG. 4 shows the sampling points for a simplified FIR filter, based on 16 samples corresponding to the FIR filter from FIG. 2.
Figure 5:
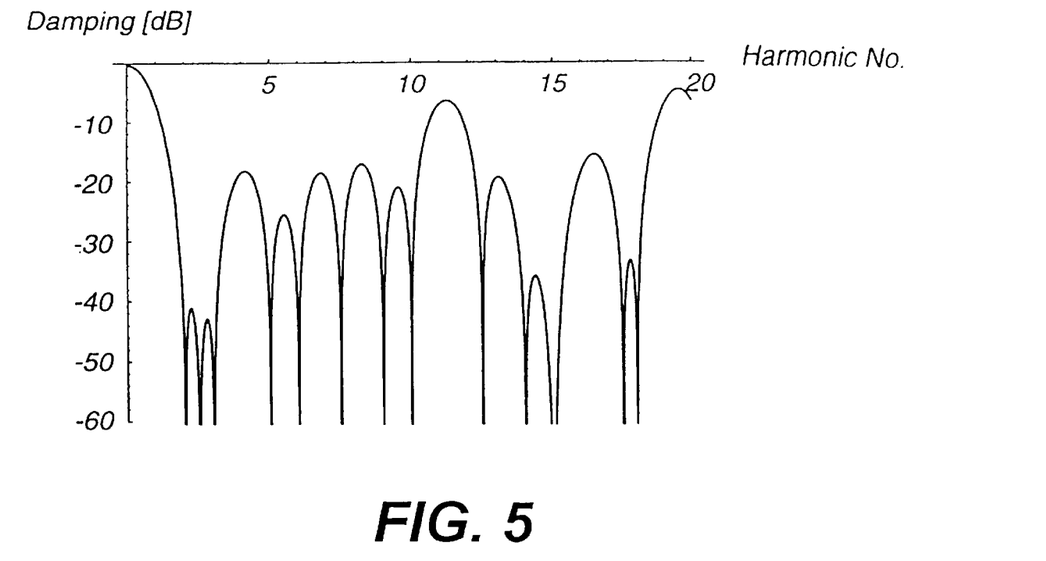
FIG. 5 shows the transfer function for a simplified FIR filter according to FIG. 4.
Figure 6:
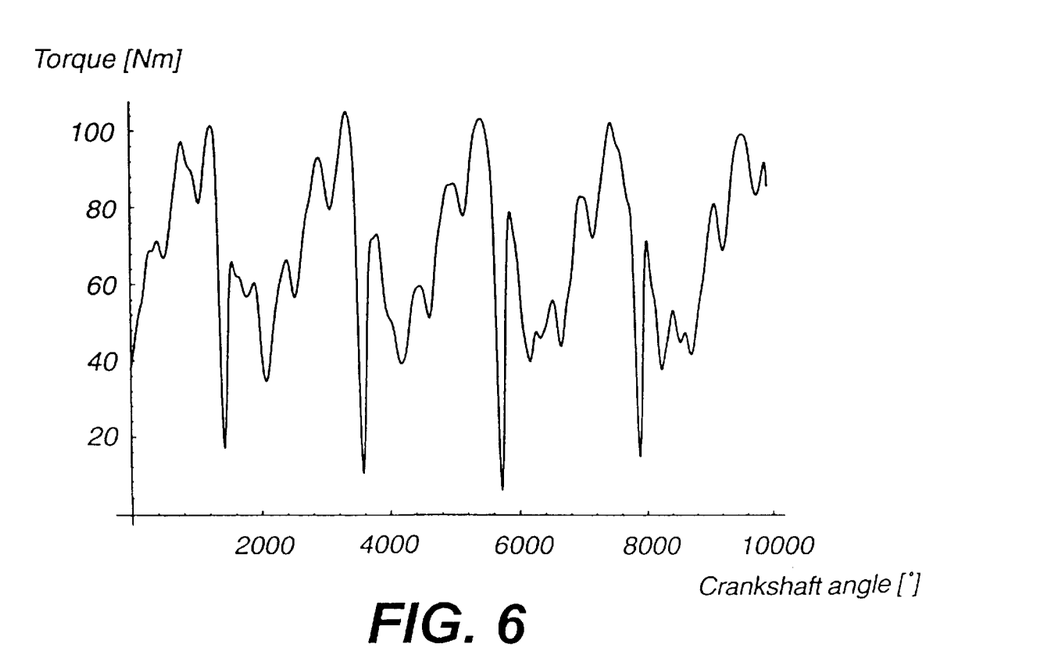
FIG. 6 shows the torque signal from a five-cylinder engine with four misfirings during 10 cycles, filtered by means of an FIR filter according to FIG. 2.
Figure 7:
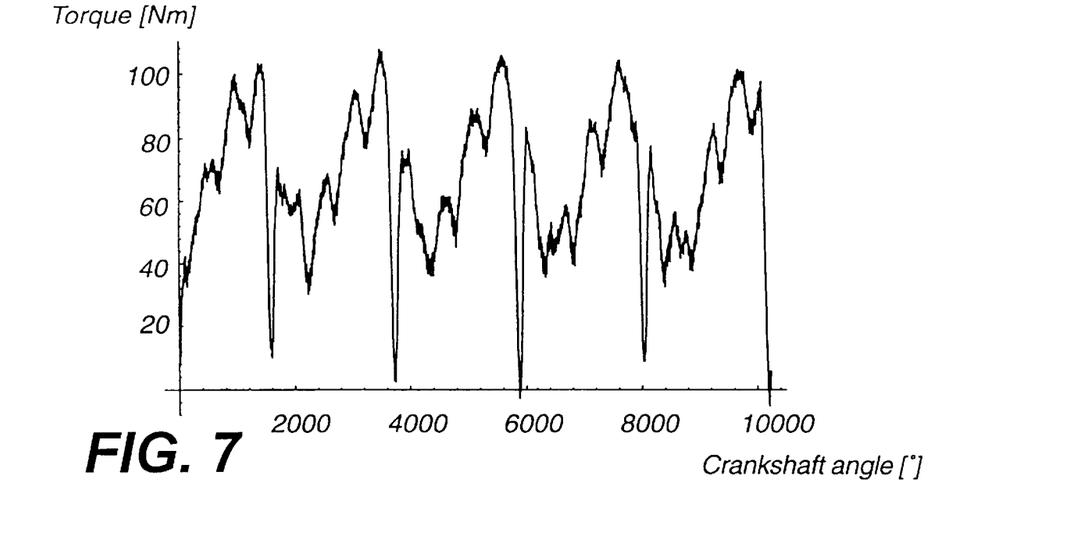
FIG. 7 shows the torque signal from the same situation as in FIG. 6, filtered by means of a simplified FIR filter according to FIG. 4.
Figure 8:
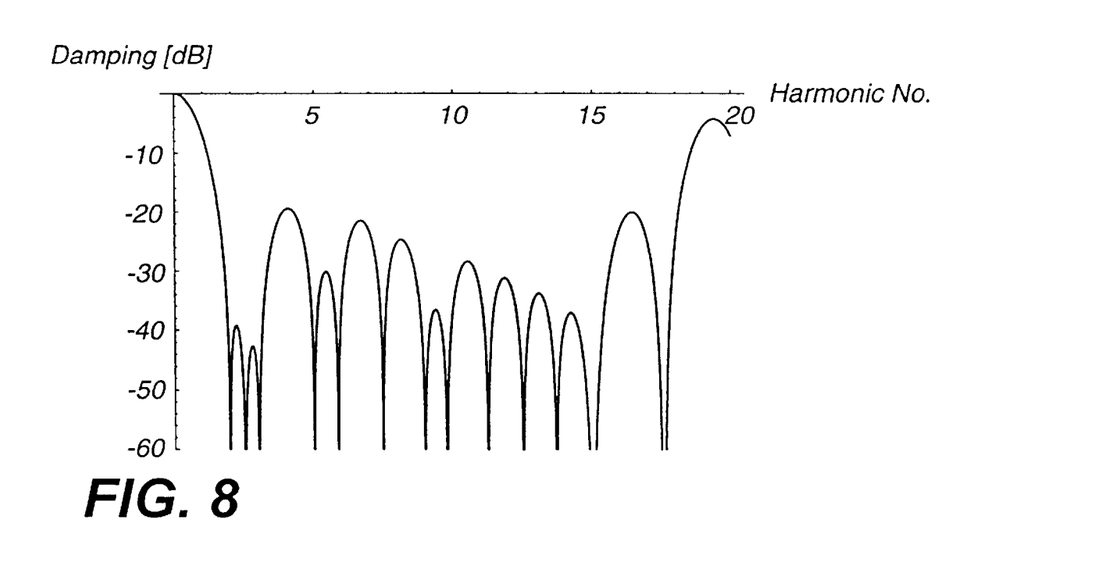
FIG. 8 shows the transfer function for a simplified FIR filter for five-cylinder engines, based on 32 samples.
Figure 9:
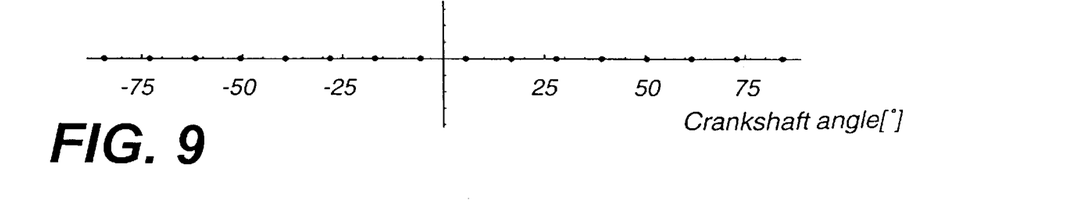
Figure 10:
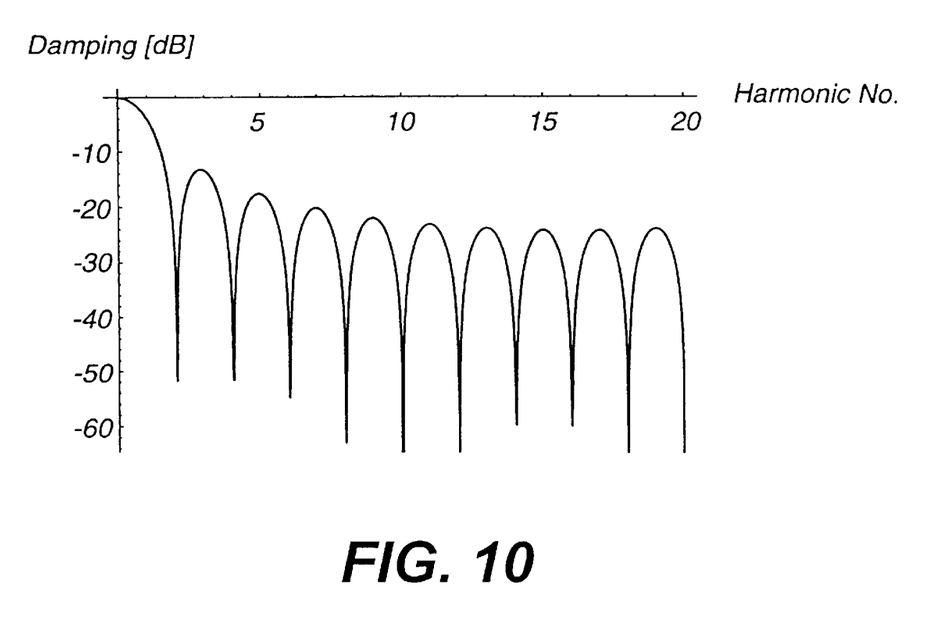
FIG. 10 shows the transfer function for a simplified FIR filter according to FIG. 9.

An embodiment of such a filter for a five-cylinder engine based on 16 samples is shown in FIG. 4, where the location of the selected samples is shown in angular degree in relation to the upper dead center at the beginning of the power stroke. The required sampling frequency for realizing this filter exactly is equal to 60 samples per turn. The transfer function for this filter is shown in FIG. 5. The transfer function of the filter has zeros at the second, $2.5^{th}$ and third tones as well as their odd harmonics, and an additional zero at the fifth tone. FIG. 6 and FIG. 7 show the filtered torque signal for a five-cylinder engine with four misfirings during 10 cycles. In FIG. 6, the previously described conventional FIR filter, obtained by convolution, has been used, in FIG. 7 the filter based on the 16 samples shown in FIG. 4. The filters in these two cases have been applied as running filters to illustrate the identification of the misfiring cylinder. In the method according to the invention, a suitable time within the work cycle is chosen for each cylinder, in which misfiring gives the clearest reading after filtering. For the purpose of misfiring indication, the signals from both filters are equivalent. The fact that the result of the modified filter contains more high-frequency noise is balanced by the considerably reduced extent of the calculation. With an increased number of samples, the filter may be further improved. FIG. 8 shows the transfer function of a filter for a five-cylinder engine based on 32 samples. For a four-cylinder in-line engine, a filter which, according to FIG. 9, is based on 16 equidistant samples is very simple and hence efficient to implement from the computational point of view. From the corresponding transfer function according to FIG. 10, it is clear that the second tone and its harmonics are eliminated.

The torque signal after the filtering, with either the conventional method or the modified FIR method according to the above, gives a value for each cylinder during a work cycle. This value is then compared with a suitable statistical measure based on a number of work cycles, as previously described.

The implementation of the misfiring detector takes place in a microcomputer system operating in real time. The filtering is carried out digitally in the software.

For Otto engines, the misfiring detector may be combined with measurement of the voltage across the spark plug and its duration to determine whether the misfiring is caused by a fault in the ignition system.

What is claimed is:

1. A method for detection of at least one of misfiring and unbalance between the cylinders of an internal combustion engine, said method comprising the steps of:
   using a torque sensor mounted on a crankshaft of an internal combustion engine to measure a torque of said internal combustion engine and generate a torque signal therefrom;
   sampling said torque signal speed-synchronously;
   performing a weighted averaging of the torque signal with a weighting function which cancels or damps an influence of sinusoidal variations of said torque signal with frequencies equal to a selection of integer or half-integer multiples of a speed of said internal combustion engine;
   wherein:
      said selection of speed multiples is substantially dependent on a number of cylinders of the internal combustion engine; and
      said detection is based on a result of said averaging.

2. A method according to claim 1, wherein said sinusoidal variations of the torque signal with frequencies equal to twice the speed of the internal combustion engine, and multiples of said speed other than two, are cancelled or damped by the weighting function.

3. A method according to claim 1, wherein at least sinusoidal variations of the torque signal with frequencies equal to 2, 2.5 and 3 times of the speed of the internal combustion engine are cancelled or damped by the weighting function.

4. A method according to claim 1, wherein at least sinusoidal variations of the torque signal with frequencies equal to 3 and 4.5 times the speed of the internal combustion engine are cancelled or damped by the weighting function.

5. A method according to claim 1, wherein at least sinusoidal variations of the torque signal with frequencies equal to 4, 5 and 6 times the speed of the internal combustion engine are cancelled or damped by the weighting function.

6. A method according to claim 1, wherein the weighting averaging is carried out once during a working cycle of each cylinder.

7. A method according to claim 1, wherein the weighting function is a rectangular function of a given length, giving all samples taken into account the same weight.

8. A method according to claim 1, wherein the weighting function is obtained by convolution of two or more rectangular functions of different lengths.

9. A method according to claim 1, wherein the averaging is performed by summation of a selection of sample points of the torque signal, said sample points being distributed on crankshaft angles in such a way that the averaging is adapted to cancel or damp the influence of sinusoidal variations of the torque signal with one or a plurality of said speed multiples.

10. A method according to claim 1, wherein misfiring is indicated when a deviation of an indicated mean effective torque, obtained by said averaging, for a cylinder from a weighted mean of the indicated mean effective torque of adjacent firings exceeds a threshold value which may depend on the indicated mean effective torque.

11. A method according to claim 10, wherein the threshold value is partly determined by a continuously formed standard deviation of a number of preceding firings.

12. A method according to claim 10, wherein a mean value of the indicated mean effective torque during a number of firings is formed for each cylinder and used for detection of at least one of continuous misfiring or unbalance between the cylinders.

13. A method according to claim 1, wherein the torque sensor is arranged between the crankshaft and a flywheel.

14. A method according to claim 1, wherein a voltage across a spark plug and the duration of said voltage are measured.

15. The method of claim 1, wherein said internal combustion engine is a diesel engine, and said method further comprises compensating for said unbalance by controlling a quantity of fuel injected into the cylinders.

16. A device for detection of misfiring of an internal combustion engine comprising:

a torque sensor mounted on a crankshaft of an internal combustion engine, for measurement of a torque of the internal combustion engine where a torque signal from said torque sensor is sampled speed-synchronously;

wherein:

a weighted averaging of the torque signal is performed with a weighted function which cancels or damps the influence from sinusoidal variations of the torque signal with frequencies equal to a selection of integers or half-integer multiples of the speed of the internal combustion engine;

the selection of said speed multiples is substantially dependent on the number of cylinders of the internal combustion engine; and the detection is based on a result of said averaging.

17. A device according to claim 16, wherein sinusoidal variations of the torque signal with frequencies equal to twice the speed of the internal combustion engine, and multiples of said speed other than two, are cancelled or damped by the weighting function.

18. A device according to claim 16, wherein at least sinusoidal variations of the torque signal with frequencies equal to 2, 2.5 and 3 times the speed of the internal combustion engine are cancelled or damped by the weighting function.

19. A device according to claim 16, wherein at least sinusoidal variations of the torque signal with frequencies equal to 3 and 4.5 times the speed of the internal combustion engine are cancelled or damped by the weighting function.

20. A device according to claim 16, wherein at least sinusoidal variations of the torque signal with frequencies equal to 4, 5 and 6 times the speed of the internal combustion engine are cancelled or damped by the weighting function.

21. A device according to claim 16, wherein the device carries out the averaging once during a working cycle of each cylinder.

22. A device according to claim 16, wherein the weighting function is a rectangular function of a given length, giving all samples taken into account the same weight.

23. A device according to claim 16, wherein the weighting function is obtained by convolution of two or more rectangular functions of different lengths.

24. A device according to claim 16, wherein the device carries out the averaging by summation of a selection of sample points of the torque signal, said sample points being distributed on the crankshaft angles in such a way that the averaging is adapted to cancel or damp the influence of sinusoidal variations of the torque signal with one or a plurality of said speed multiples.

25. A device according to claim 16, wherein said device indicates misfiring when a deviation of an indicated mean effective torque, obtained by said averaging, for a cylinder from a weighted mean of the indicated mean effective torque of adjacent firings exceeds a threshold value which may depend on the indicated mean effective torque.

26. A device according to claim 25, wherein said threshold value is partly dependent on a continuously formed standard deviation of a number of preceding firings.

27. A device according to claim 25, wherein the device, for each cylinder, forms a mean value of the indicated mean effective torque during a number of firings for detection of at least one of continuous misfirings or unbalance between the cylinders.

28. A device according to claim 16, wherein the torque sensor is arranged between the crankshaft and a gearbox.

29. A device according to claim 16, wherein the torque sensor is arranged between the crankshaft and a flywheel.

30. A device according to claim 16, wherein the torque sensor is a magnetoelastic transducer.

31. A device according to claim 16, wherein the device also comprises means for measurement of a voltage across a spark plug and the duration of said voltage.

* * * * *